United States Patent
Kandula et al.

(10) Patent No.: US 10,108,241 B2
(45) Date of Patent: Oct. 23, 2018

(54) METHOD AND APPARATUS FOR SAVING POWER OF A PROCESSOR SOCKET IN A MULTI-SOCKET COMPUTER SYSTEM

(71) Applicant: Intel Corporation, Santa Clara, CA (US)

(72) Inventors: Phani Kumar Kandula, Bangalore (IN); Tessil Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 14/486,695

(22) Filed: Sep. 15, 2014

(65) Prior Publication Data

US 2016/0077568 A1  Mar. 17, 2016

(51) Int. Cl.
*G06F 1/32* (2006.01)
*G06F 9/50* (2006.01)

(52) U.S. Cl.
CPC .......... *G06F 1/3206* (2013.01); *G06F 1/3237* (2013.01); *G06F 9/50* (2013.01); *Y02D 10/128* (2018.01)

(58) Field of Classification Search
CPC .............. G06F 1/3237; Y02B 60/1221; Y02B 60/1285; H04L 12/433
USPC ........................................................ 713/322
See application file for complete search history.

(56) References Cited

U.S. PATENT DOCUMENTS

| | | | | |
|---|---|---|---|---|
| 6,671,835 B1* | 12/2003 | Hanna | .................. | H04N 1/0473 714/712 |
| 2002/0196700 A1* | 12/2002 | Ryan | .................... | G11C 7/1006 365/238.5 |
| 2007/0143640 A1* | 6/2007 | Simeral | ..................... | G06F 1/28 713/320 |
| 2010/0146157 A1* | 6/2010 | Choi | ....................... | G06F 13/28 710/22 |
| 2011/0055452 A1* | 3/2011 | Suzuki | ............... | G06F 13/4022 710/317 |
| 2012/0191998 A1* | 7/2012 | Tazebay | .................. | H04L 12/12 713/323 |
| 2012/0311360 A1* | 12/2012 | Balasubramanian | | G06F 1/3237 713/323 |
| 2013/0042127 A1* | 2/2013 | Thomas | ................ | G06F 1/3225 713/323 |
| 2015/0286261 A1* | 10/2015 | Bose | ....................... | G06F 1/324 713/322 |

* cited by examiner

*Primary Examiner* — Dennis M Butler
*Assistant Examiner* — Santosh R Poudel
(74) *Attorney, Agent, or Firm* — Green, Howard, & Mughal LLP

(57) ABSTRACT

Described is an apparatus comprising: a plurality of system agents, at least one system agent including one or more queues; and logic to monitor the one or more queues in at least one system agent and to cause the plurality of system agents to block traffic after satisfaction of a criterion.

27 Claims, 5 Drawing Sheets

METHOD AND APPARATUS FOR SAVING POWER OF A PROCESSOR SOCKET IN A MULTI-SOCKET COMPUTER SYSTEM

BACKGROUND

A server may have multiple processor sockets coupled together. Each processor may have multiple cores. When all cores in a processor (in a socket) enter C3 or C6 power saving states, the socket is considered to be in a PC2 power state, where the power states are defined by the Advanced Configuration and Power Interface (ACPI) specification. The server enters PC3 or PC6 power states, when all cores of all processors in all sockets of the server are in C3 or C6 power states, respectively.

However, in PC2 power state, a significant portion of the processor remains active and powered up because other cores of other processors in other sockets (of the server) may not be in C3 or C6 power saving states. One reason for part of the processor to remain in active state during PC2 socket power state is because any operating core from any other processor of another socket may request use of resources of the processor. Keeping part of the processor in an active state during PC2 socket power state consumes dynamic power.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
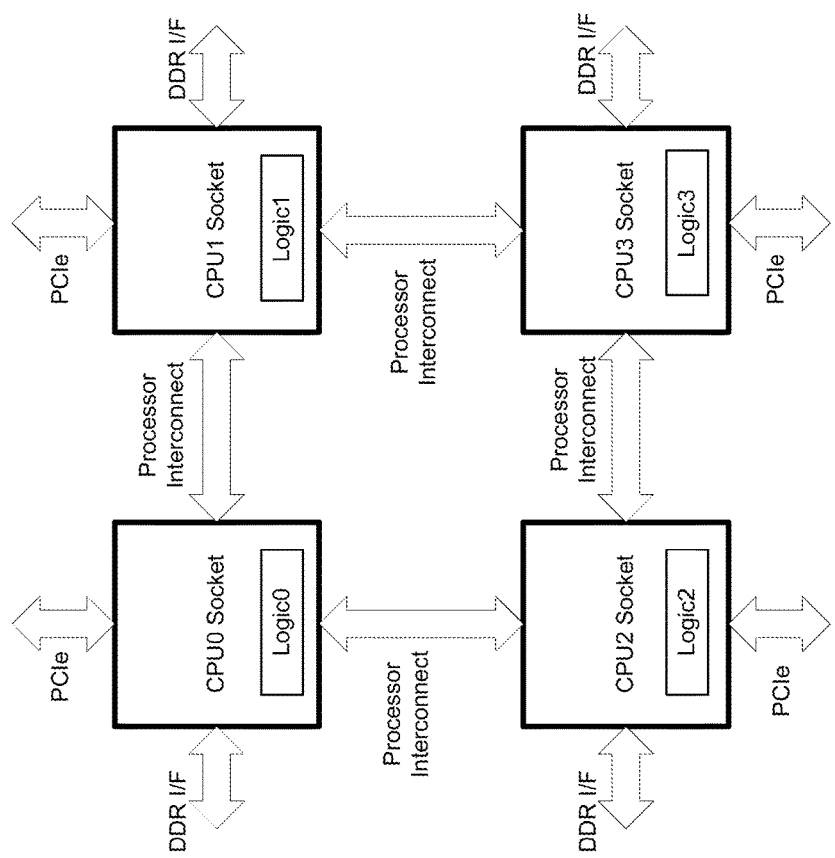
FIG. 1 illustrates a multi-socket computer system with logic to gate a clock signal of a processor when that processor is in a particular power state (e.g., PC2 power state), according to some embodiments of the disclosure.

Some embodiments describe an apparatus and method for clock gating a significant portion of the processor (e.g., un-core part of the processor) when the socket of the processor is in a certain power state (e.g., PC2 power state). In some embodiments, a processor comprises a plurality of system agents, where each system agent includes one or more queues. In some embodiments, the processor further comprises logic to monitor the one or more queues in each system agent and to cause the plurality of system agents to block traffic after satisfaction of a criterion (e.g., that all queues have been empty for a predetermined time).

In some embodiments, the processor comprises a plurality of First-In-First-Out (FIFO) buffers or queues each of which is coupled to a system agent. In some embodiments, the logic monitors whether the plurality of FIFO buffers are empty. In some embodiments, the logic is operable to gate a clock signal after satisfaction of the criterion and after determining that the plurality of FIFO buffers is empty. In some embodiments, the logic is operable to un-gate the clock signal after the satisfied criterion is no longer satisfied. In some embodiments, the logic is operable to unblock the traffic to buffers and/or queues after the satisfied criterion is no longer satisfied.

There are many technical effects of some of the embodiments. For example, additional 200 mW of power is saved using SPECWEB'09 e-commerce (RHEL Kernel 3.0.3) benchmark with the embodiments compared to without the embodiments. The additional power savings reduce operating costs of server farms having such processors.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−20% of a target value.

For purposes of the embodiments, the transistors in various circuit or logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 illustrates a multi-socket computer system 100 with logic to gate a clock signal of a processor when that processor is in a particular power state (e.g., PC2 power state), according to some embodiments of the disclosure.

In some embodiments, multi-socket computer system 100 (e.g., a server) comprises a number of Central Processing Unit (CPU) Sockets—here, four are shown as CPU0, CPU1, CPU2, and CPU3—coupled together in a ring or mesh such that each socket includes its respective logic—Logic0, Logic1, Logic2, and Logic3—which is operable to gate the clock signal to the un-core portion of the respective processors. Here, the term un-core refers to all components or sections of a processor which are outside of the processor core, for example, last level cache (LLC), Power Control Unit (PCU), peripheral transceivers, system agents, etc.

Each socket is coupled to another socket via Processor Interconnects (which can be any type of interconnect). Each socket may also interface (I/F) through a system agent with memory via a dedicated interface. For example, each socket may couple to a Dynamic Random Access Memory (DRAM) via a Double Data Rate (DDR) I/F. Each socket may also interface through a system agent with a peripheral device or card via a dedicated interface. For example, each socket may couple to a graphics card via a Peripheral Component Interconnect Express (PCIe) I/F.

The multi-socket computer system 100 enters PC3 or PC6 power state, when all cores of all processors in all sockets of the multi-socket computer system 100 are in one type of power state (e.g., C3 or C6 power states). In some embodiments, when a socket enters a certain power state (e.g., PC2 power state), logic of that processor is operable to gate its clock to the un-core section of that processor even when other processors in other sockets are not in that particular power state (e.g., C3 or C6 power states).

So as not to obscure the embodiments, the embodiments are described with reference to C3 or C6 power states for the processor core(s) and PC2 power state for the socket as described in ACPI specification. However, the embodiments can be extended to any power state for the processor core(s) in a multi-socket computer system where there is an opportunity to realize further power savings in the un-core portion of a processor by blocking system agents and buffers upon meeting a certain criterion.

For example, when CPU0 Socket is in the PC2 power state while any of the other socket's core (e.g., CPU3 Socket) is not in C3 or C6 power states, Logic0 of CPU0 Socket can monitor traffic on its system agents and block those system agents if there is no data or requests in its queues and/or in the queues of associated FIFOs (or queues). So as not to obscure the embodiments, various aspects of some embodiments are described with reference to CPU0 Socket. However, the same explanation applies to other sockets in the multi-socket computer system 100.

In some embodiments, after blocking the system agents and/or associated FIFOs (or queues), Logic0 gates the clock signal to various portions (or all portions) of the un-core to save dynamic power consumption. In some embodiments, as soon as any request for resource is detected on any of the system agents of CPU0 Socket, Logic0 unblocks the system agents and/or associated FIFOs (or queues), and also ungates the clock signal to the un-core section of that processor. Unlike a traditional multi-socket computer system, more dynamic power savings are realized by some embodiments.

Figure 2:
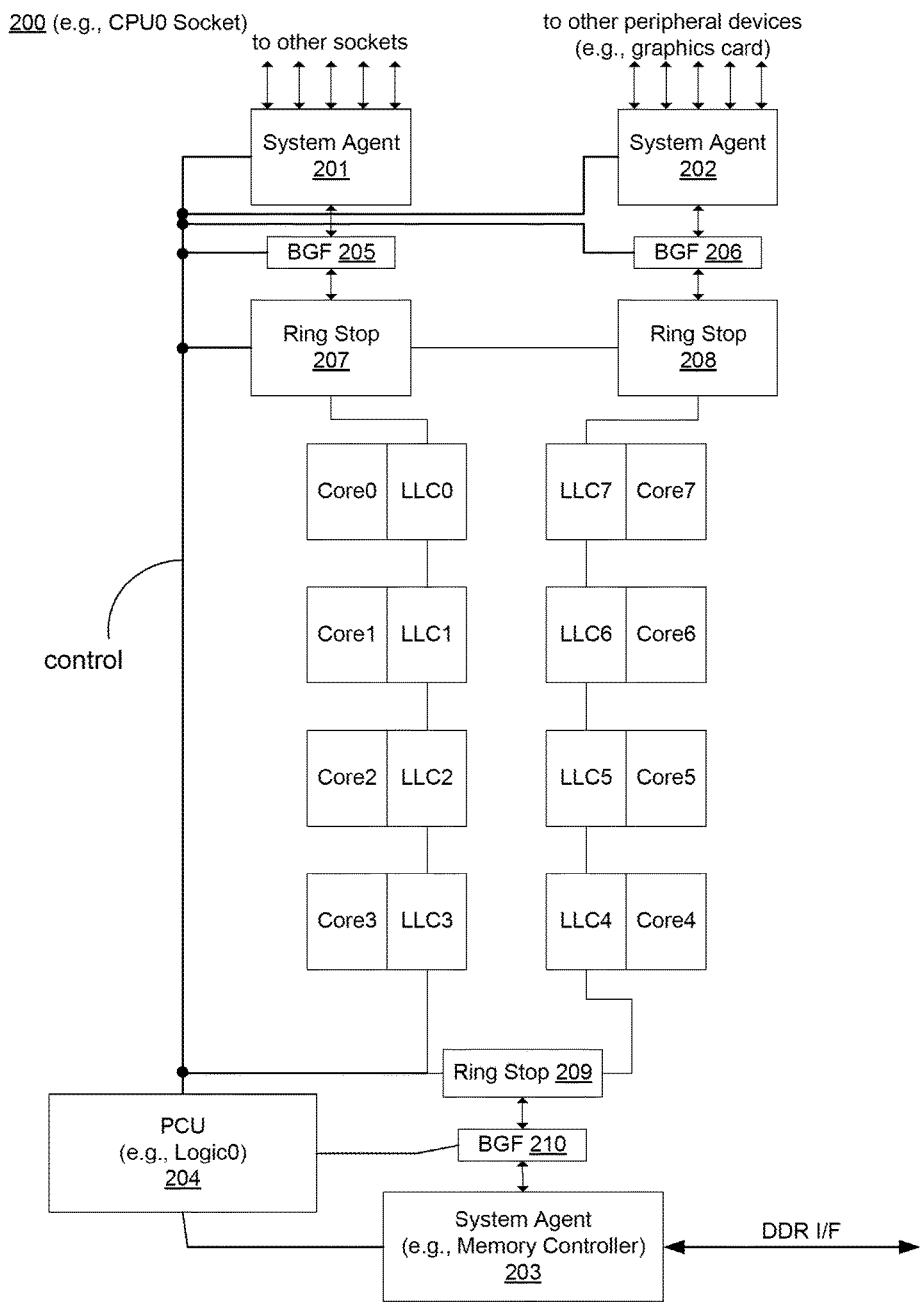
FIG. 2 illustrates a multi-core processor which is operable to gate its clock signal when that processor is in a particular power state (e.g., PC2 power state), according to some embodiments of the disclosure.

FIG. 2 illustrates a multi-core processor 200 (e.g., CPU0 Socket) which is operable to gate its clock signal when that processor is in a particular power state (e.g., PC2 power state), according to some embodiments of the disclosure. It is pointed out that those elements of FIG. 2 having the same reference numbers (or names) as the elements of any other figure can operate or function in any manner similar to that described, but are not limited to such. So as not to obscure the embodiments, four sockets are assumed. A computer system may include any number of sockets.

In one embodiment, multi-core processor 200 comprises a plurality of System Agents (e.g., 201, 202, and 203), Control Unit (e.g., 204), FIFOs (e.g., 205, 206, and 210), buffers (e.g., 207, 208, and 209), plurality of processing cores (e.g., Core0-Core7), and plurality of caches (e.g., LLC0-LLC7). In some embodiments, Control Unit 204 is a Power Control Unit (PCU) and includes logic (e.g., Logic0) which is operable to gate clock signals (via control signal(s)) of the un-core portion when multi-core processor 200 is in PC2 power state. PCU is a microcontroller that manages power and other operations of the processor. While the embodiments are described with reference to clock gating some or all portions of the un-core, when multi-core processor 200 enters PC2 power state, clock to some or all portions of the un-core can also be gated when the sockets are in other power states (e.g., PC3 and PC6 power states).

FIFOs 205, 206, and 210 may be Bubble Generator FIFOs (BGFs). Bubble Generator FIFOs transfer data from one clock domain to another domain without loss of data. Buffers 207, 208, and 209 may be Ring Stop buffers which operate at the same frequency as the operating frequency of LLC0-LLC7. Ring Stop buffers act as intermediate buffers for data received from or sent to System Agents.

PCU 204 manages power states of multi-core processor 200. For example, PCU 204 manages compliance to C-states as defined by the ACPI specification. While the embodiments are described with reference to four CPU sockets in a multi-processor computer system 100, eight processor cores in each socket 200, eight caches in each socket 200, three system agents in each socket 200, three BGFs in each socket 200, and three buffers or queues in each socket 200, any number of CPU sockets, processor cores, caches, System agents, BGFs and Ring Stop buffers may be used.

System Agent 201 provides an interface to couple CPU0 Socket to other sockets. For example, System Agent 201 provides an interface to couple CPU0 Socket to CPU1 Socket and CPU2 Socket. System Agent 202 provides an interface (e.g., PCIe I/F) to couple CPU0 Socket to peripheral cards (e.g., Graphics card). System Agent 203 functions as a Memory Controller that interfaces (e.g., via a DDR I/F) to a memory (e.g., DRAM). In some embodiments, PCU 204 is operable to control clock signals (i.e., to gate or un-gate the clock signal via control signal(s)) to System Agents 201, 202, and 203. In some embodiments, PCU 204 is operable to monitor one or more queues in each System Agent and/or BGFs (e.g., 205, 206, and 210), Ring Stop buffers (e.g., 207, 208, and 210) to determine whether the queues are empty or have data. Based on that determination, PCU 204 may gate or un-gate clock signals to Ring Stop buffers (e.g., 207, 208, and 210) and to the plurality of caches (e.g., LLC0-LLC7), according to some embodiments.

In some embodiments, PCU 204 is operable to control clock signals (i.e., to gate or un-gate the clock signal via control signal(s)) to BGFs 205, 206, and 210. In some embodiments, PCU 204 is operable to monitor the FIFO(s) in each BGF to determine whether the FIFO(s) are empty or have data. Based on that determination, PCU 204 may gate or un-gate clock signals to BGFs 205, 206, and 210, according to some embodiments.

In some embodiments, PCU 204 is operable to control clock signals (i.e., to gate or un-gate the clock signal via control signal(s)) to Ring Stop buffers 207, 208, and 209. In some embodiments, PCU 204 is operable to monitor the buffer(s) in each Ring Stop buffer to determine whether the buffer(s) are empty or have data. Based on that determination, PCU 204 may gate or un-gate clock signals to Ring Stop buffers 207, 208, and 209, according to some embodiments.

In some embodiments, Logic0 of PCU 204 controls the clock signal (i.e., by gating or un-gating the clock signal) to LLC0-LLC7, BGFs 205, 206, 210, and Ring Stop buffers 207, 208, and 209. Here, the un-core portion includes System Agents 201, 202, 203, PCU 204, BGFs 205, 206, and 210, Ring Stop buffers 207, 208, and 209, and LLC0-LLC7 (i.e., all logic except for Core0-Core7). In some embodiments, Logic0 may not clock gate the clock to the PCU 104 because Logic0 needs to be active to manage power to portions of the un-core.

Generally, when a socket enters the PC2 power state, a significant portion of the processor (i.e., un-core part of the processor) in that socket remains active and powered up because other cores of other processors in other sockets may not be in C3 or C6 power saving states. One reason for part of the processor to remain in the active state during PC2 socket power state is because any operating core from any other processor of another socket may request use of resources of the processor.

For example, assuming PCU 204 does not have Logic0, as described in various embodiments, then the un-core portion of multi-core processor 200 remains powered-up in PC2 state because any other processor core from any other socket (e.g., CPU1 Socket to CPU3 Socket) may want to access any of the caches LLC0-LLC7 or the memory (e.g., DRAM) coupled to System Agent 203. Keeping the un-core portion powered on (when multi-core processor 200 enters PC2 power state) may be a waste of power. The various embodiments described here conserve that power by monitoring activity of various logics in multi-core processor 200 and then determining when to gate or un-gate the clock various portions of the un-core.

Figure 3:
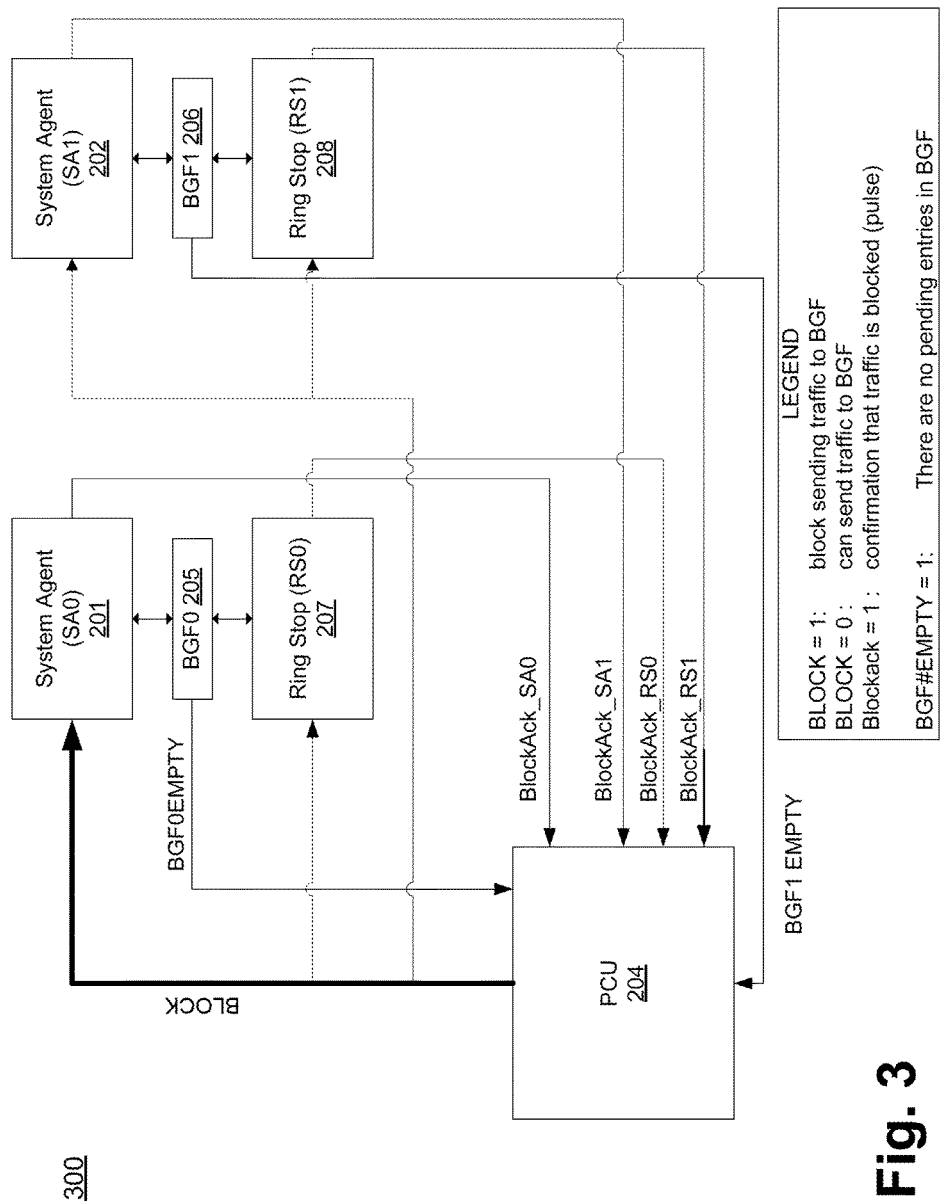
FIG. 3 illustrates logic of the multi-core processor which is operable to gate its clock signal when that processor is in a particular power state (e.g., PC2 power state), according to some embodiments of the disclosure.

FIG. 3 illustrates logic 300 of multi-core processor 200 which is operable to gate its clock signal when processor 200 is in a particular power state (e.g., PC2 power state), according to some embodiments of the disclosure. It is pointed out that those elements of FIG. 3 having the same reference numbers (or names) as the elements of any other figure can operate or function in any manner similar to that described, but are not limited to such.

Various control signals are described here according to some embodiments. In some embodiments, Logic0 of PCU 204 monitors one or more queues in each System Agent and BGF to determine whether they are empty. So as not to obscure the embodiments, two system agents, two BGFs, and two Ring Stop buffers of FIG. 2 are shown.

Referring back to FIG. 3, in some embodiments, if the queues are empty, then PCU 204 is informed of that. In some embodiments, BGF0 205 and BGF1 206 provide their respective empty signals (i.e., BGF0EMPTY and BGF1EMPTY) to Logic0 of PCU 204. Here, BGF0EMPTY and BGF1EMPTY also indicate the status of the queues in the System Agents. When BGF0EMPTY and BGF1EMPTY are logical high, it means that there are no pending entries in the BGFs. Note, the logic can be modified to process no pending entries in the BGFs when BGF0EMPTY and BGF1EMPTY are logical low. In some embodiments, Logic0 performs an AND operation on all BGF#EMPTY (where '#' is an integer) signals from various buffers, queues, and FIFOs to determine whether all buffers, queues, and FIFOs associated with the un-core portion are empty before clock signals can be gated.

In some embodiments, when it is determined that the BGFs are empty, PCU 204 asserts the BLOCK signal to instruct the System Agents 201 (SA0) and 202 (SA1) and Ring Stop (RS) buffers 207 (RS0) and 208 (RS1) to block sending of traffic to BGF0 205 and BGF1 206. In some embodiments, a handshake procedure is followed to ascertain that System Agents 201 and 202 and Ring Stop buffers 207 and 208 have indeed blocked sending of traffic to BGF0 205 and BGF1 206. Blocking may be achieved by various methods. For example, Ring Stop buffers 207 and 208 are tri-stated when blocked. In some embodiments, System Agents 201 and 202 send BlockAck_SA0 and BlockAck_SA1 signals to Logic0 of PCU 204, and Ring Stop buffers 207 and 208 send BlockAck_RS0 and BlockAck_RS1 signals to Logic0 of PCU 204. Here, BLOCK, BlockAck_RS0, BlockAck_RS1, BlockAck_SA0, and BlockAck_SA1 signals are the control signals.

In this example, when BlockAck_SA0 and BlockAck_SA1 signals are asserted, PCU 204 is informed that System Agents 201 and 202 have successfully blocked sending of traffic to BGF0 205 and BGF1 206. In some embodiments, when BlockAck_RS0 and BlockAck_RS1 signals are asserted, PCU 204 is informed that Ring Stop buffers 207 and 208 have successfully blocked sending of traffic to BGF0 205 and BGF1 206. In some embodiments, when all acknowledgements from the blocks are received in the affirmative, then Logic0 gates the clock signal to most of the un-core. In some embodiments, PCU 204 and System Agents 201 and 202 are not clock gated because PCU 204 has to manage the clock gating and System Agents have to be alert regarding new requests.

In some embodiments, when all block acknowledgements are received in the affirmative, Logic0 starts a timer to count for a predetermined (or programmable) time to check whether BGF0EMPTY and BGF1EMPTY continue to indicate that the queues are empty. The time can be implemented using any type of hardware counter architecture. The timer in such embodiments behaves like a filter. If before the completion of the predetermined time count, any of BGF0EMPTY and BGF1EMPTY de-asserts, PCU 204 de-asserts the BLOCK signal to allow sending of traffic to BGF0 205 and BGF1 206, according to some embodiments.

In some embodiments, when it is determined that the BGFs are not empty, PCU 204 de-asserts the BLOCK signal to instruct System Agents 201 and 202 and Ring Stop buffers 207 and 208 to unblock themselves. In such embodiments, traffic to BGF0 205 and BGF1 206 is unblocked. For example, Ring Stop buffers 207 and 208 are unblocked when they are not tri-stated and can drive signals. In some embodiments, when BLOCK signal is de-asserted, BlockAck_SA0, BlockAck_SA1, BlockAck_RS0 and BlockAck_RS1 are de-asserted and Logic0 un-gates the clock signal to most of the un-core.

Figure 4:
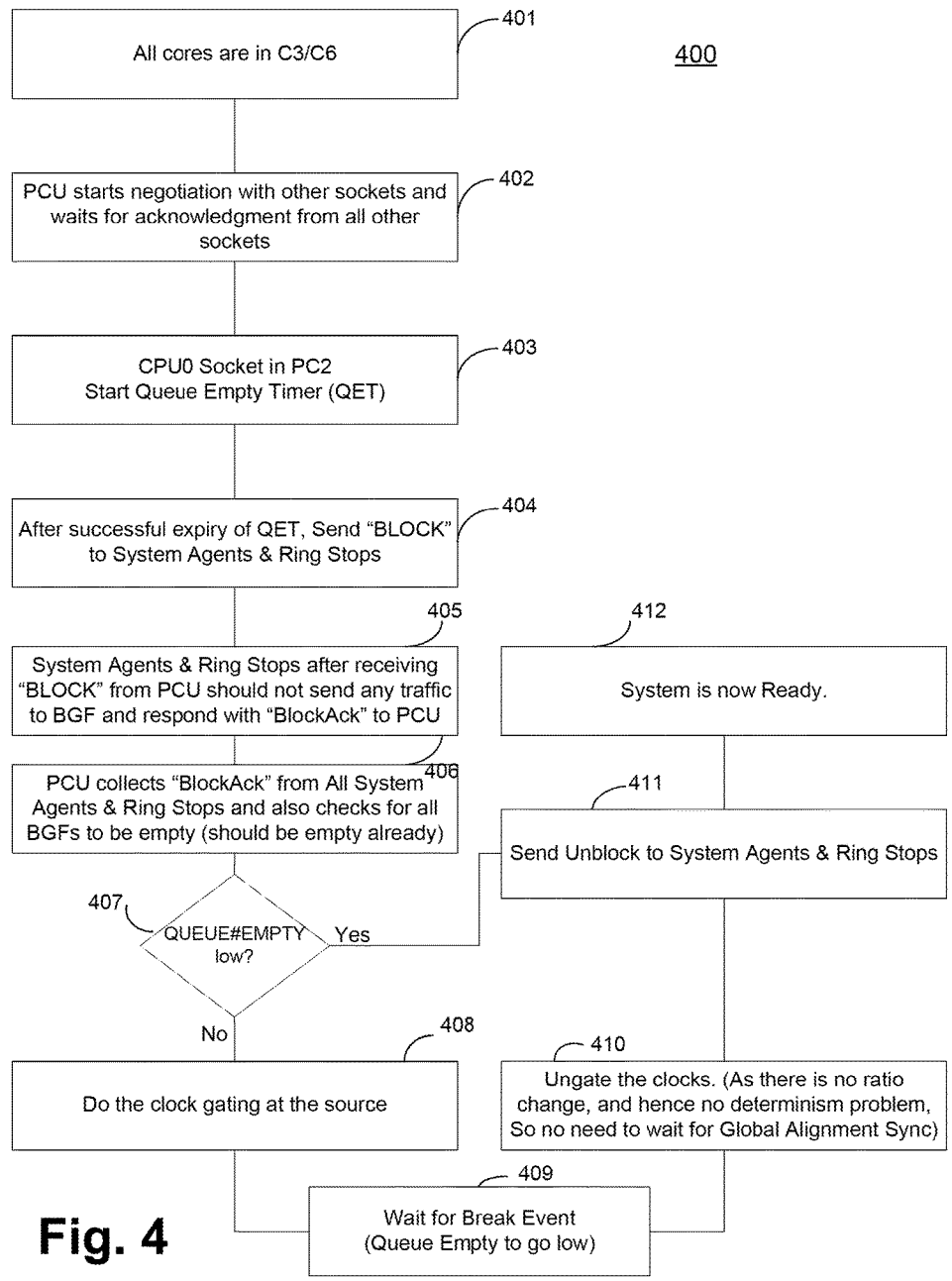
FIG. 4 illustrates a flowchart of a method to gate a clock signal of the multi-core processor when that processor is in a particular power state (e.g., PC2 power state), according to some embodiments of the disclosure.

FIG. 4 illustrates a flowchart 400 of a method to gate a clock signal of the multi-core processor when that processor is in a particular power state (e.g., PC2 power state), according to some embodiments of the disclosure. It is pointed out that those elements of FIG. 4 having the same reference numbers (or names) as the elements of any other figure can operate or function in any manner similar to that described, but are not limited to such.

Although the blocks in the flowchart with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Block 401 indicates a starting point for the power savings described here, according to some embodiments. At the starting point, all cores (i.e., Core0-Core7) of processor 200 are in C3 or C6 power states. At block 402, PCU 204 of CPU0 Socket begins to negotiate with other sockets (e.g., CPU1 Socket, CPU2 Socket, and CPU3 Socket) to determine whether CPU0 Socket can enter the PC2 power state. During this process, PCU 204 waits for acknowledgements from all sockets meanwhile it places CPU0 Socket in PC2 power state.

At block 403 (i.e., when CPU0 Socket is in PC2 power state), a Queue Empty Timer (QET) starts to count up to a predetermined (or programmable) time. QET counter can also be implemented as a down counter that counts down from a predetermined count value to zero, according to some embodiments. As the QET begins to count, PCU 204 monitors one or more queues in System Agents (201, 202, and 203) and/or BGFs (205, 206, and 210) and Ring Stop buffers (207, 208, and 209) to determine whether they are empty or have any data or requests for resources of (or coupled to) CPU0 Socket, according to some embodiments.

In some embodiments, input of QET counter is QUEUE#EMPTY, where '#' is an integer indicating a unique system agent and BGF. In some embodiments, QET is part of the logic implemented in PCU 204. In this example, when QUEUE#EMPTY is logic high, queue is empty, and when QUEUE#EMPTY is logic low, queue is not empty. If it is determined that there are any requests or data in the queues waiting to be processed, QET timer resets itself and it begins to count again. If it is determined that there are no requests or data in the queues waiting to be processed and the QET timer count expires (i.e., reaches its predetermined value), then the process proceeds to block 404.

At block 404, PCU 204 asserts the BLOCK signal (as described with reference to FIG. 3) to instruct the System Agents (201, 202, and 203) and/or the Ring Stop buffers (207, 208, and 209) to block sending of traffic to BGFs (205, 206, and 210). The process then proceeds to block 405. At block 405, PCU 204 checks the status of BlockAck signals (e.g., BlockAck_SA0, BlockAck_SA1, BlockAck_RS0 and BlockAck_RS1 signals) from the System Agents (201, 202, and 203) and the Ring Stop buffers (207, 208, and 209). If the status of the BlockAck signals indicates a successful blocking of traffic to BGFs (205, 206, and 210), for example, when the BlockAck signals are a logic 1, then the process proceeds to block 407.

At block 407, PCU 204 determines whether queues in BGFs (205 206, and 210) are empty. For example, each BGF may send BGF#EMPTY signal to PCU 204 to inform PCU 204 the status of the queue(s) in that BGF. When all BGF#EMPTY signals indicate to PCU 204 that the queues in the BGFs are empty (e.g., when all BGF#EMPTY signals are logical high), then PCU 204 begins the process of gating the clock signals for various portions of the un-core (e.g., BGFs, Ring Stop buffers, caches, etc.) as indicated by block 408. By gating the clock signals, dynamic power consumption is saved. The clock signals may be gated for as long as BGF#EMPTY signals and QUEUE#EMPTY signals are logic high, according to some embodiments.

At block 409, PCU 204 monitors the status of QUEUE #EMPTY signals. If any of the QUEUE#EMPTY signals de-asserts (i.e., becomes logic low), then the process proceeds to block 410. At block 410, PCU 204 un-gates the clock signals in the un-core. In some embodiments, since divider ratio(s) of phase locked loop(s) generating the clock signals do not change, there is no determinism issue. As such, in some embodiments, there is no need for synchronization of clock signals after the clock signals are un-gated (e.g., there is no need to wait for a global alignment synchronization signal). The process then proceeds to block 411.

As described with reference to block 407, when any of the QUEUE #EMPTY signals indicate to PCU 204 that the queues in the BGFs have any data or request, then the process proceeds to block 411. At block 411, PCU 204 de-asserts the BLOCK signal to cause System Agents (201, 202, and 203) and/or Ring Stop buffers (207, 208, and 209) to unblock sending of traffic to BGFs (205, 206, and 210). At block 412, CPU0 Socket is now ready to process data from System Agents (201, 202, and 203).

Program software code/instructions associated with flowchart 400 and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 400 are executed by PCU 204.

In some embodiments, the program software code/instructions associated with flowchart 400 are stored in a computer executable storage medium and executed by PCU 204. Here, computer executable storage medium is a tangible machine readable medium that can be used to store program software code/instructions and data that, when executed by a computing device, cause a processor (e.g., PCU 204) to perform a method(s) as may be recited in one or more accompanying claims directed to the disclosed subject matter.

The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions (associated with flowchart 400) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Figure 5:
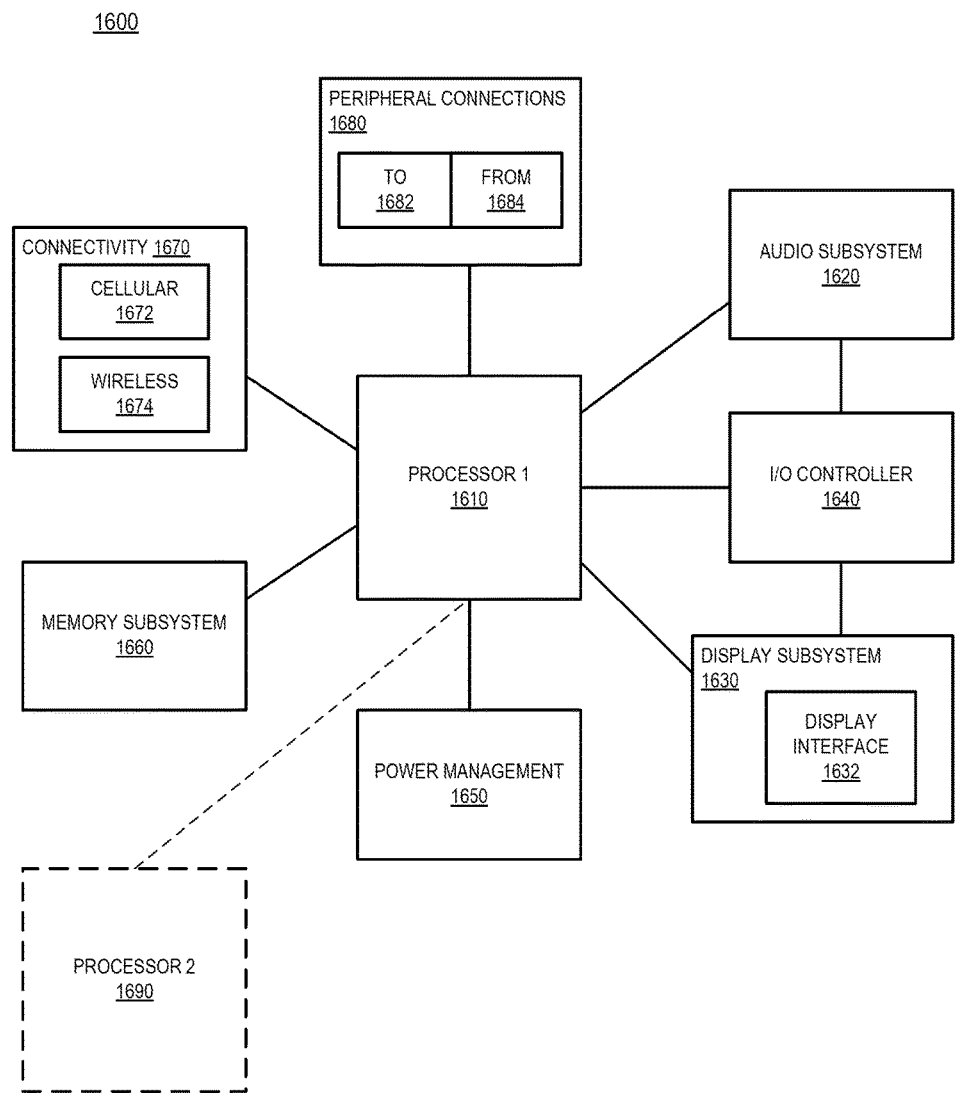
FIG. 5 illustrates a smart device or a computer system or a SoC (System-on-Chip) having logic which is operable to gate a clock signal of a processor when that processor is in a particular power state (e.g., PC2 power state), according to some embodiments of the disclosure.

FIG. 5 illustrates a smart device or a computer system or a SoC (System-on-Chip) having logic which is operable to gate clock signal of a processor when that processor is in a particular power state (e.g., PC2 power state), according to some embodiments of the disclosure. It is pointed out that those elements of FIG. 5 having the same reference numbers (or names) as the elements of any other figure can operate or function in any manner similar to that described, but are not limited to such.

FIG. 5 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 having logic which is operable to gate clock signal of a processor when that processor is in a particular power state (e.g., PC2 power state), according to some embodiments discussed. Other blocks of the computing device 1600 may also having logic which is operable to gate clock signal of a processor when that processor is in a particular power state (e.g., PC2 power state), according to some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a processor is provided which comprises: a plurality of system agents, each system agent including one or more queues; and logic to monitor the one or more queues in at least one system agent and to concurrently cause the plurality of system agents to block traffic after satisfaction of a criterion. In some embodiments, the processor comprises a plurality of FIFO buffers at least one of which is coupled to a system agent of the plurality of system agents. In some embodiments, the logic to monitor whether the plurality of FIFO buffers are empty. In some embodiments, the logic to gate a clock signal after satisfaction of the criterion and after determining that the plurality of FIFO buffers are empty.

In some embodiments, the logic to un-gate the clock signal after the satisfied criterion is no longer satisfied. In some embodiments, the logic to unblock the traffic after the satisfied criterion is no longer satisfied. In some embodiments, the plurality of system agents includes: a first system agent for coupling the processor with another processor; a second system agent for coupling the processor with a memory; and a third system agent for coupling the processor with a peripheral device or card. In some embodiments, the criterion is a power state. In some embodiments, the power state is a PC2 power state. In some embodiments, the criterion is duration of time the one or more queues remain empty. In some embodiments, the logic to cause the plurality of system agents to block traffic by tri-stating drivers of the plurality of system agents.

In another example, a system is provided which comprises: a plurality of processors, at least one of the processors, in a socket and coupled together in a ring, wherein a processor of the plurality comprises: a plurality of caches coupled together in a ring and at least one cache to receive a ring clock; and logic to gate the ring clock when the processor enters a particular power state. In some embodiments, the processor comprises a plurality of system agents, and wherein at least one system agent including one or more queues. In some embodiments, the logic is operable to monitor the one or more queues in at least one system agent and to cause the plurality of system agents to block traffic after satisfaction of a criterion.

In some embodiments, the criterion is duration of time the one or more queues remain empty. In some embodiments, one of the system agents is coupled to another processor of the plurality of processors. In some embodiments, the processor comprises a plurality of queues at least one of which is coupled to a system agent of the plurality of system agents. In some embodiments, the logic to monitor whether the plurality of queues are empty. In some embodiments, the logic to gate the ring clock after satisfaction of the criterion and after determining that the plurality of queues are empty. In some embodiments, the logic to un-gate the ring clock after the satisfied criterion is no longer satisfied. In some embodiments, the logic to unblock traffic after the satisfied criterion is no longer satisfied.

In another example, a method is provided which comprises: monitoring one or more queues in at least one system agent of the plurality of system agents of a socket; and blocking the plurality of system agents after satisfaction of a criterion. In some embodiments, the method comprises: starting a timer for a predetermined time to check whether the one or more queues in at least one system agent remains empty during the predetermined time; and blocking the plurality of system agents, by tri-stating them, after the one or more queues remain empty during the predetermined time. In some embodiments, the method comprises gating a clock signal after blocking the plurality of system agents. In some embodiments, the method comprises un-gating the clock signal if any of the one or more queues in at least one system agent has data. In some embodiments, the criterion is a power state.

In another example, an apparatus is provided which comprises: means for monitoring one or more queues in each system agent of the plurality of system agents of a socket; and means for blocking the plurality of system agents after satisfaction of a criterion. In some embodiments, the apparatus comprises: means for starting a timer for a predetermined time to check whether the one or more queues in each system agent remains empty during the predetermined time; and means for blocking the plurality of system agents after the one or more queues remain empty during the predetermined time. In some embodiments, the apparatus comprises means for gating a clock signal after blocking the plurality of system agents. In some embodiments, the apparatus comprises means for un-gating the clock signal if any of the one or more queues in each system agent has data.

In another example, a system is provided which comprises: a plurality of processors each in a socket and coupled together in a ring, wherein a processor of the plurality comprises: means for monitoring one or more queues in each system agent of the plurality of system agents of a socket; and means for blocking the plurality of system agents after satisfaction of a criterion. In some embodiments, the processor comprises: means for starting a timer for a predetermined time to check whether the one or more queues in each system agent remains empty during the predetermined time; and means for blocking the plurality of system agents after the one or more queues remain empty during the predetermined time. In some embodiments, the processor comprises means for gating a clock signal after blocking the plurality of system agents. In some embodiments, the processor comprises means for un-gating the clock signal if any of the one or more queues in each system agent has data.

In another example, a server is provided which comprises: a plurality of sockets, each socket having a processor which comprises: a plurality of system agents, each system agent including one or more queues; and logic to monitor the one or more queues in each system agent and to cause the plurality of system agents to block traffic after satisfaction of a criterion; and a wireless interface for allowing the plurality of sockets to communicate with other devices.

In some embodiments, the processor comprises a plurality of FIFO buffers each of which is coupled to a system agent of the plurality of system agents. In some embodiments, the logic to monitor whether the plurality of FIFO buffers are empty. In some embodiments, the logic to gate a clock signal after satisfaction of the criterion and after determining that the plurality of FIFO buffers are empty. In some embodiments, the logic to un-gate the clock signal after the satisfied criterion is no longer satisfied. In some embodiments, the logic to unblock the traffic after the satisfied criterion is no longer satisfied. In some embodiments, the plurality of system agents includes: a first system agent for coupling the processor with another processor; a second system agent for coupling the processor with a memory; and a third system agent for coupling the processor with a peripheral device or card.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A first processor socket, comprising:
   a plurality of system agents, at least two system agents including one or more corresponding queues, wherein the first processor socket is coupled to at least a second processor socket and a third processor socket, wherein the at least two system agents include a first system agent that is to couple the first processor socket with another processor socket; and
   logic to:
      monitor the one or more queues in at least the first system agent that is to couple the first processor socket with another processor socket, and concurrently cause the plurality of system agents to block traffic to the one or more queues of at least the two system agents, in response to: the first processor socket entering one of a C3 power state or a C6 power state, and at least one of the second processor socket or the third processor socket not operating in either of the C3 power state or the C6 power state, and
      gate a clock signal to an un-core section of the first processor socket, subsequent to the traffic to the one or more queues of at least the two system agents being blocked.

2. The first processor socket of claim 1, further comprising a plurality of FIFO buffers at least one of which is coupled to a system agent of the plurality of system agents.

3. The first processor socket of claim 2, wherein the logic is to monitor whether the plurality of FIFO buffers are empty.

4. The first processor socket of claim 3, wherein the logic is to gate the clock signal after determining that the plurality of FIFO buffers are empty.

5. The first processor socket of claim 4, wherein the logic is to un-gate the clock signal after a satisfied criterion is no longer satisfied.

6. The first processor socket of claim 4, wherein the logic is to unblock the traffic after a satisfied criterion is no longer satisfied.

7. The first processor socket of claim 1, wherein the plurality of system agents includes:
   a second system agent for coupling the processor socket with a memory; and
   a third system agent for coupling the processor socket with a peripheral device or card.

8. The first processor socket of claim 1, wherein the logic is to concurrently cause the plurality of system agents to block traffic to the one or more queues of each system agent, in response to a duration of time the one or more queues remain empty being higher than a threshold.

9. The first processor socket of claim 1, wherein the logic is to cause the plurality of system agents to block traffic by tri-stating drivers of the plurality of system agents.

10. The first processor socket of claim 1, wherein the first processor socket, the second processor socket, and the third processor socket are coupled in a ring structure.

11. The first processor socket of claim 1, wherein the un-core section of the first processor socket comprises one or more caches.

12. The first processor socket of claim 11, wherein the one or more caches comprises a plurality of caches arranged in a ring.

13. The first processor socket of claim 1, wherein the at least one system agent is to couple the first processor socket to one or both the second processor socket or the third processor socket.

14. The first processor socket of claim 1, wherein the logic is to cause a handshake procedure to ascertain that the plurality of system agents have blocked the traffic.

15. The first processor socket of claim 1, wherein the first system agent is to generate an acknowledgement signal to assert that the first system agent is blocking traffic.

16. A system comprising:
   a plurality of processors, at least one of the processors, in a socket and coupled together in a ring, wherein a processor of the plurality comprises:
   a plurality of caches coupled together in a ring and at least one cache to receive a ring clock;
   logic to gate the ring clock when the processor enters a particular power state;
   wherein the processor comprises a plurality of system agents, including a first system agent that is to couple the socket with another socket, and wherein at least one system agent includes one or more queues; and
   wherein the logic is operable to monitor the one or more queues in at least the first system agent and to concurrently cause the plurality of system agents to block traffic to the one or more queues in at least the first system agent after satisfaction of a criterion, in response to the processor entering a first low power state or a second low power state,
   wherein while the processor is to enter the first low power state or the second low power state, another processor of the plurality is to operate in a power state that is different from either of the first low power state or the second low power state.

17. The system of claim 16, wherein the criterion is duration of time the one or more queues remain empty.

18. The system of claim 16, wherein one of the system agents is coupled to another processor of the plurality of processors.

19. The system of claim 18, wherein the processor comprises a plurality of queues at least one of which is coupled to a system agent of the plurality of system agents.

20. The system of claim 19, wherein the logic is to monitor whether the plurality of queues are empty.

21. The system of claim 20, wherein the logic is to gate the ring clock after satisfaction of the criterion and after determining that the plurality of queues are empty.

22. The system of claim 20, wherein the logic is to un-gate the ring clock after the satisfied criterion is no longer satisfied.

23. The system of claim 20, wherein the logic is to unblock traffic after the satisfied criterion is no longer satisfied.

24. A method comprising:
monitoring one or more queues in at least one system agent of the plurality of system agents of a first socket, wherein the monitored one or more queues includes queues of a first system agent that is to couple the first socket with another socket;
starting a timer for a predetermined time to check whether the one or more queues in at least one system agent remains empty during the predetermined time based on the monitoring;
blocking traffic to the plurality of system agents, by tri-stating them, after the one or more queues remain empty during the predetermined time and while the first socket of a server operates in a low power state; and
operating, by a second socket of the server, in a power state other than the low power state, while the first socket of the server operates in the low power state.

25. The method of claim 24 comprises gating a clock signal after blocking the plurality of system agents.

26. The method of claim 24 comprises un-gating the clock signal if any of the one or more queues in at least one system agent has data.

27. The method of claim 24, wherein the low power state is one of a C3 power state or a C6 power state.

* * * * *